United States Patent
Silver et al.

(10) Patent No.: US 12,122,689 B2
(45) Date of Patent: *Oct. 22, 2024

(54) ELECTRODES FOR COST-EFFECTIVE BIO-ELECTROCHEMICAL SYSTEMS

(71) Applicant: Cambrian Innovation, Inc., Watertown, MA (US)

(72) Inventors: Matthew Silver, Cambridge, MA (US); Justin Buck, Auburndale, MA (US); Casey Chartier, Cambridge, MA (US); Mark Barosky, Boston, MA (US); James Ryan Hawkins, Boston, MA (US); Zhen Huang, Newton, MA (US); Quynh Anh Le Tran, Springfield, MA (US); Tzipora Wagner, Somerville, MA (US)

(73) Assignee: Cambrian Innovation, Inc., Watertown, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/532,413

(22) Filed: Aug. 5, 2019

(65) Prior Publication Data
US 2020/0031692 A1     Jan. 30, 2020

Related U.S. Application Data

(63) Continuation of application No. 14/551,462, filed on Nov. 24, 2014, now Pat. No. 10,370,270.
(Continued)

(51) Int. Cl.
*C02F 1/461*     (2023.01)
*C25D 13/20*     (2006.01)
(Continued)

(52) U.S. Cl.
CPC .......... *C02F 1/46109* (2013.01); *C25D 13/20* (2013.01); *C25D 13/22* (2013.01);
(Continued)

(58) Field of Classification Search
CPC .... C02F 1/46109; C02F 3/005; C02F 11/006; C02F 2001/46133; C02F 2001/46142; C02F 2001/46152; C02F 2001/46161; C02F 2201/4611; C02F 2303/10; C02F 2301/08; C02F 1/283; C02F 3/2826; C02F 3/345; C02F 1/46114; C02F 3/1273; C02F 2103/002; C02F 2001/46157; C02F 2201/46115; C02F 2201/46135;
(Continued)

(56) References Cited

U.S. PATENT DOCUMENTS

2012/0003504 A1*  1/2012  Yamazawa .............. H01M 8/16
                                                                     429/2
2013/0319940 A1   12/2013  Josse et al.

FOREIGN PATENT DOCUMENTS

WO    WO 2012/012647    *  1/2012

* cited by examiner

*Primary Examiner* — Xiuyu Tai
(74) *Attorney, Agent, or Firm* — Capital Patent & Trademark Law Firm, PLLC (57) ABSTRACT

An electrode for use in bio-electrochemical systems is described, including: a substantially planar electrode material; a frame comprising a non-conductive substance; and one or more first conductive substances linked or secured to the frame. Bio-electrochemical systems, racks for inserting the electrode, and methods of using the racks are also described.

15 Claims, 8 Drawing Sheets

Related U.S. Application Data

(60) Provisional application No. 61/907,523, filed on Nov. 22, 2013.

(51) Int. Cl.
*C25D 13/22* (2006.01)
*H01M 4/90* (2006.01)
*H01M 8/16* (2006.01)
*C02F 3/00* (2023.01)
*C02F 11/00* (2006.01)

(52) U.S. Cl.
CPC .......... *H01M 4/9075* (2013.01); *H01M 8/16* (2013.01); *C02F 2001/46133* (2013.01); *C02F 2001/46142* (2013.01); *C02F 2001/46152* (2013.01); *C02F 2001/46161* (2013.01); *C02F 3/005* (2013.01); *C02F 11/006* (2013.01); *C02F 2201/4611* (2013.01); *Y02E 50/30* (2013.01); *Y02E 60/50* (2013.01)

(58) Field of Classification Search
CPC ......... C02F 2101/006; C02F 2103/005; C25D 13/20; C25D 13/22; H01M 4/9075; H01M 8/16; Y02E 50/30; Y02E 60/50; Y02E 60/527; Y02E 50/343; Y02W 10/15; Y02W 10/10; Y02W 10/37; Y02W 10/30

See application file for complete search history.

ELECTRODES FOR COST-EFFECTIVE BIO-ELECTROCHEMICAL SYSTEMS

RELATED APPLICATIONS

The present application claims priority to U.S. Provisional Application 61/907,523, filed Nov. 22, 2013, which is hereby incorporated by reference herein in its entirety, and is a continuation of U.S. patent application Ser. No. 14/551,462 filed Nov. 24, 2014 which is also incorporated by reference herein in its entirety.

INCORPORATION BY REFERENCE

All patents, patent applications and publications cited herein are hereby incorporated by reference in their entirety in order to more fully describe the state of the art as known to those skilled therein as of the date of the invention described herein.

BACKGROUND

Historically, the treatment of water and other substances has required the consumption of energy and has been an expensive process. Wastewater is generated from numerous industrial processes. In particular, food and beverage and agricultural processes generate a substantial volume of wastewater. In addition, many methods of obtaining fuel for energy result in environmental hazards such as, for example, polluted groundwater. Most waste treatment processes involve the oxidation or reduction of the target pollutant.

Bio-electrochemical systems (BESs) are a class of technologies capable of treating water while generating electricity or other value-added products such as methane and hydrogen. Based on the ability of newly discovered microbes (termed "electricigens") to interact electrically with electrodes through direct electrode contact, soluble mediators, and conductive biological nanowires, BESs can be configured into fuel cells with living, regenerative catalysts.

Bio-electrochemical systems utilize biology as the catalytic system for an oxidation or reduction reaction. Bio-electrochemical system applications can feature either or both electrode reactions and include, amongst others, processes for waste treatment, chemical formation, and energy production. The biological component of a bio-electrochemical system interfaces with an electrode which serves as the interface to the electrical circuitry coupling the two (oxidation and reduction) half-cell reactions. As such, the properties of the electrodes of a bio-electrochemical system are critical to the operation of the system. The electrodes should provide, at a minimum, high electrical conductivity, large surface area, and bio-compatible material.

SUMMARY

The current invention involves various novel concepts for electrodes suitable for use in bio-electrochemical systems (BESs), methods for fabricating such electrodes and BESs incorporating such electrodes into broader systems.

In some embodiments, BESs include electrodes, such as anode and cathodes, both or individually coated in bio-films (i.e., microbial communities) with the ability to transfer or accept electrons from electrodes. Electrodes utilizing such microbial communities are often referred to as biological electrodes, or bio-electrodes. Electrodes may also incorporate noble metals to catalyze one of the reactions taking place. Electrodes containing an inorganic catalyst may be used without a bio-film and are termed abiotic electrodes. The electrodes can be separated by an electrolyte which conveys ions between them (often a membrane). Electrodes, bio-films, electrolytes, and catalysts may or may not be enclosed in a casing or multiple casings which enclose a single or multiple chambers. Each of these elements, which include the casing, can be connected to external circuits, control systems, or other reactors for use in combined systems. The geometrical configuration of the elements in a microbial fuel cell and their material definition can together be defined as the "architecture" of the system.

Fuel and chemical products of BESs can include a wide range of reduced organic or inorganic substrates. A non-limiting exemplary source of fuel is the substrates found in wastewater including sugars and low weight organic molecules such as ethanol and acetic acid. Because they can remove biological oxygen demand (BOD) in wastewater while generating modest amounts of electricity, BESs have the potential to greatly enhance the closure and energetics of water treatment systems. BESs have the potential to function in a wide variety of capacities, including generating multiple useful products, improving the efficiency of existing removal systems and aiding in the capture of $CO_2$.

In order to maximize the efficiency and economic viability of BES systems which incorporate electrodes, materials and designs of the electrodes are designed to maximize characteristics such as conductivity, surface area and bio-compatibility while minimizing the cost of materials and construction.

In one aspect, an electrode for use in bio-electrochemical systems is described, the electrode including:
a substantially planar electrode material;
a frame including a non-conductive substance; and
one or more first conductive substances linked or secured to the frame, wherein the first conductive substance is electrically connected to the planar electrode material as one or more current collectors.

In any one or more embodiments disclosed herein, the one or more first conductive substances and the frame, taken together, form the unitary body of the frame.

In any one or more embodiments disclosed herein, the one or more first conductive substances is attached or secured to the body of the frame.

In any one or more embodiments disclosed herein, the frame is attached to the exterior or perimeter of the said planar electrode material.

In any one or more embodiments disclosed herein, the frame is rigid.

In any one or more embodiments disclosed herein, the planar electrode material is porous.

In any one or more embodiments disclosed herein, the planar electrode material is a mesh.

In any one or more embodiments disclosed herein, the frame includes a non-conductive polymer material.

In any one or more embodiments disclosed herein, the electrode further includes rubber padding interposed between the polymer material and the first conductive substance.

In any one or more embodiments disclosed herein, the frame includes two parts fastened on the opposite sides of the planar electrode material.

In any one or more embodiments disclosed herein, the electrode further includes one or more second conductive surfaces electrically connected to the current collectors and exposed to the exterior of the frame.

In any one or more embodiments disclosed herein, the electrode is joined with another electrode or other electrodes in the same plane by the frame.

In any one or more embodiments disclosed herein, the electrode is joined with another electrode or other electrodes in the same plane by a dual-sided channel (H-channel or other suitable channels). The dual-sided channel may or may not be integral to the frame.

In any one or more embodiments disclosed herein, the electrode is substantially planar.

In another aspect, an electrode assembly is described, including the electrode of any one or more embodiments disclosed herein, and one or more planar plastic mesh adjacent to the electrode.

In any one or more embodiments disclosed herein, the planar plastic mesh is configured to be a spacer.

In any one or more embodiments disclosed herein, the frame includes one or more grooves and the planar plastic mesh is inserted into the one or more grooves of the frame.

In yet another aspect, a bio-electrochemical electrode cassette is described, including:
   at least one working electrode including
      a substantially planar electrode material;
      a frame including a non-conductive substance; and
      one or more first conductive substances linked or secured to the frame, wherein the conductive substance is electrically connected to the planar electrode material as one or more current collectors;
   at least one counter electrode; and
   at least one insulating spacer.

In any one or more embodiments disclosed herein, the one or more first conductive substances and the frame, taken together, form the unitary body of the frame.

In any one or more embodiments disclosed herein, the one or more first conductive substances is attached or secured to the body of the frame.

In any one or more embodiments disclosed herein, the frame is attached to the exterior or perimeter of the said planar electrode material.

In any one or more embodiments disclosed herein, the frame is rigid.

In any one or more embodiments disclosed herein, the planar electrode material is porous.

In any one or more embodiments disclosed herein, the planar electrode material is a mesh.

In any one or more embodiments disclosed herein, the frame includes a non-conductive polymer material.

In any one or more embodiments disclosed herein, the cassette further includes rubber padding interposed between the polymer material and the first conductive substance.

In any one or more embodiments disclosed herein, the frame includes two parts fastened on the opposite sides of the planar electrode material.

In any one or more embodiments disclosed herein, the working electrode further includes one or more second conductive surfaces electrically connected to the current collectors and exposed to the exterior of the frame.

In any one or more embodiments disclosed herein, any two or more components selected from the group consisting of the working electrode, the counter electrode, and the insulating spacer are joined together by the frame.

In any one or more embodiments disclosed herein, any two or more components selected from the group consisting of the working electrode, the counter electrode, and the insulating spacer are joined together by a dual-sided channel (H-channel). The dual-sided channel may or may not be integral to the frame.

In any one or more embodiments disclosed herein, the working electrode is substantially planar.

In yet another aspect, a bio-electrochemical system is described, including:
   at least one reactor chamber;
   at least one working electrode disposed within the reactor chamber;
   at least one counter electrode; and
   a rack disposed within the reactor chamber and including one or more securing mechanisms; wherein the at least one working electrode is disposed in the rack through the one or more securing mechanisms.

In any one or more embodiments disclosed herein, the at least one working electrode is disposed in the rack in the form of a cassette.

In any one or more embodiments disclosed herein, the working electrode is in electrical communication with the rack.

In any one or more embodiments disclosed herein, the securing mechanism is a slotted groove or fastener.

In any one or more embodiments disclosed herein, the rack includes a conductive substance.

In any one or more embodiments disclosed herein, the rack includes stainless steel.

In any one or more embodiments disclosed herein, the rack includes one or more hydraulic distribution elements.

In any one or more embodiments disclosed herein, the rack includes one or more elements for enhanced mixing.

In any one or more embodiments disclosed herein, the rack includes one or more fluid-collection elements.

In any one or more embodiments disclosed herein, the rack includes one or more connection points for hoisting.

In any one or more embodiments disclosed herein, the rack includes features for gas injection.

In any one or more embodiments disclosed herein, the rack includes features for reference electrode installation.

In any one or more embodiments disclosed herein, the rack further includes one or more sensors for collecting system information.

In any one or more embodiments disclosed herein, the rack further includes one or more elements for wiring integration.

In any one or more embodiments disclosed herein, the rack further includes one or more components configured to enhance the separation of solids from liquid.

In any one or more embodiments disclosed herein, the rack further includes one or more components configured to enhance the separation of gas from liquid.

In any one or more embodiments disclosed herein, the rack is disposed at the top region of the reactor chamber.

In any one or more embodiments disclosed herein, the bottom region of the reactor chamber is configured for sludge based digestion.

In yet another aspect, a method of operating the system is disclosed, the system including:
   at least one reactor chamber;
   at least one working electrode disposed within the reactor chamber;
   at least one counter electrode; and
   a rack disposed within the reactor chamber and including one or more securing mechanisms; wherein the at least one working electrode is disposed in the rack through the one or more securing mechanisms.

In any one or more embodiments disclosed herein, the working electrode is positioned perpendicular to liquid flow inside the bio-electrochemical system.

In any one or more embodiments disclosed herein, the working electrode is positioned parallel to liquid flow inside the bio-electrochemical system.

In any one or more embodiments disclosed herein, the working electrode is positioned at an angle relative to the direction of liquid flow inside the bio-electrochemical system. Non-limiting examples of the angles include about 5, 10, 15, 20, 25, 30, 35, 40, 45, 50, 60, 70, 80, or 85 degree, or in a range bounded by any two of the angles disclosed herein.

In any one or more embodiments disclosed herein, the working electrode and/or counter-electrode is a planar electrode.

In any one or more embodiments disclosed herein, the rack further includes one or more hydraulic elements to direct flow.

In any one or more embodiments disclosed herein, the system further includes one or more components configured to enhance the separation of solids and/or gases from liquid.

In any one or more embodiments disclosed herein, the working electrode is a component of the hydraulic element or a component of the gas-liquid and/or solid-liquid separator.

In yet another aspect, a method for the construction of electrode materials for a bio-electrochemical system is described, including:

electrochemically coating a conductive substrate with a coating substance by application of a current.

In any one or more embodiments disclosed herein, the coating substance is a powder.

In any one or more embodiments disclosed herein, the coating substance is in suspended or dissolved in a liquid.

In any one or more embodiments disclosed herein, the coating substance is a polymer material impregnated with one or more substances selected from the group consisting of a conductive substance and a high surface area substance.

In any one or more embodiments disclosed herein, the conductive substance is carbon.

In any one or more embodiments disclosed herein, the conductive substrate is one or more substances selected from the group consisting of aluminum, carbon, copper, chromium, iron, nickel, titanium, tungsten, magnesium, alloys thereof, and mixtures thereof.

In any one or more embodiments disclosed herein, the conductive substrate is one or more substances selected from the group consisting of steel, stainless steel, brass and bronze.

In any one or more embodiments disclosed herein, the coating substance is one or more substances selected from the group consisting of carbon and epoxy ink.

In any one or more embodiments disclosed herein, the high surface area substance is carbon.

In any one or more embodiments disclosed herein, the coating substance is a metal in liquid form.

In any one or more embodiments disclosed herein, the method further includes heating the conductive substrate prior to, during, or after the step of coating the conductive substrate with the coating substance.

In any one or more embodiments disclosed herein, heating is achieved by the heat generated through electrical resistance of the conductive substrate or an induced electric current.

DESCRIPTION OF THE DRAWINGS

The invention is described with reference to the following figures, which are presented for the purpose of illustration only and are not intended to be limiting. In the Drawings.

DETAILED DESCRIPTION

The current invention involves various novel concepts for electrodes suitable for use in BESs, methods for fabricating such electrodes and BESs incorporating such electrodes into a broader system.

Electrode Materials and Methods of Manufacture

This invention includes novel electrodes and methods of preparation thereof for use in a BES. The novel electrodes and methods of preparation thereof may address multiple obstacles to the construction of cost-effective electrodes for use in a BES. Generally, the greater the conductivity of the electrodes, the more efficient they are. However, the conditions in which BES electrodes are used are non-optimal for many cost-effective conductive materials. Disadvantages include a tendency to corrode and/or biocidal characteristics.

In some embodiments, electrodes for use in a BES system may include a conductive substance to which a coating has been applied, addressing the aforementioned obstacles. Methods of application of a coating include electrodeposition (electroplating or electrophoretic painting, brush painting, spray painting, and dipping).

In certain embodiments, application of a coating can be used to protect the substrate from corrosion, to protect the biology from the biocidal characteristics of the substrate, or both. Coating application can be achieved by electrodeposition: the coating may be initially applied to the surface of the substrate in the form of a solid powder. Electrical current would then be applied to cause the electrochemical bonding of the coating substance to the surface of the substrate. Alternatively, the coating may be applied through submersion of the substrate in a solution containing the coating materials before the application of current.

In some embodiments, coating application can also be achieved by painting, wherein a liquid coating material is spread onto the conductive substrate with a brush or other comparable tool, or a liquid coating material is sprayed onto the conductive substrate with a pressurized device. The coating may also be applied by dipping the substrate into a solution of the coating material and allowing any residual material to drip off. Such a coating may be stabilized or cured post-application by heating the coated substrate to a high temperature. Heat-cured coatings may be composed of any number or compounds including but not limited to: polymers, resins, epoxies, or silicones. A heat-cured coating may be set (stabilized) by heating the substrate/base material prior to exposure to the coating material, while immersed in the coating material, or after being covered with a layer of the coating material. A non-limiting example of heating the base material may be achieved through the heat generated through electrical resistance (joule heating) or an induced electric current (induction heating).

In some embodiments, substrate materials contemplated include any conductive material, such as aluminum, carbon, copper, chromium, iron, nickel, titanium, tungsten, or alloys/mixtures thereof, such as steel, stainless steel, brass, or bronze. The coating materials may be any of the aforementioned conductive materials, applied by electrodeposition, or may be a polymer impregnated with a conductive material described herein, e.g., carbon. In some embodiments, the coating may also include other substances, such as catalysts for the desired reactions and/or binding agents to improve adhesion of the coating to the substrate. Non-limiting examples of catalytic materials may include activated carbon, platinum, cobalt, gold, manganese, iron, and nickel. Binding agents may include epoxy, varnish, polymers or other compounds with suitable chemical properties.

The coating may contain elements of different size and shape to facilitate increased surface area and high electrical conductivity. An example would be including a carbon fiber in a carbon-based paint (which may be composited of both conductive carbon and activated carbon). The carbon fibers could be applied in a step following the conductive paint application to allow protrusion from the coated surface.

The shape of the substrate can be any desired shape. In certain embodiments, the shape is a planar shape, such as a mesh or sheet. The planar electrode may have different porosity and open surface features. The planar electrode can have a conductive material integrated into the assembly to facilitate the collection of electrical current.

Rugged Electrode Architecture

In some embodiments, the electrodes incorporate current collectors into a support structure. This will facilitate the cost-effective assembly of rugged electrodes for use in a BES. These electrodes may also be constructed and arranged in order to facilitate the easy maintenance or replacement of individual electrodes in a multi-electrode BES. This will be accomplished by constructing the electrodes so that they will fit into an electrode holding structure, such as a rack, from which they may be easily inserted into or removed from the BES individually and with minimal labor.

In some embodiments, an electrode assembly may contain several components and structures with various functions. As discussed above, the electrode material facilitates the catalysis of the oxidation and reduction reactions. A current collector facilitates the transfer of electrical current from the electrode to the external electrical circuitry. The current collector may be integrated into the structure of the electrode (e.g. the base material) or may be incorporated as a separate material. A frame can provide support and structure to the electrode. The frame can be directly incorporated with electrode material and/or the current collector. Insulating materials can be added to the electrode to prevent electrical shorting to other components. These insulating materials can be incorporated into or used in conjunction with the frame material.

Electrode Frame: Support Structure, Insulator, and/or Current Collector

Figure 1:
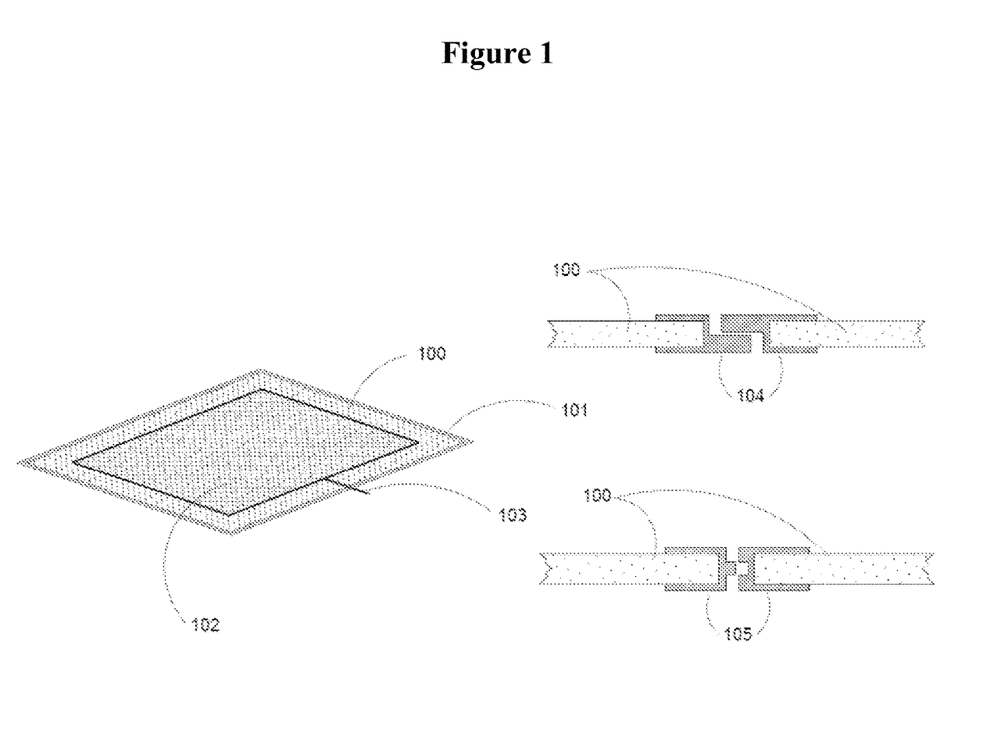
FIG. 1 illustrates a planer electrode (100) with a frame (101), an integrated current collector (102), and an electrical contact point (103) protruding from the frame, according to one or more embodiments.

The electrode disclosed according to one or more embodiments is now described with reference to FIG. 1. FIG. 1 illustrates a planer electrode (100) with a frame (101), an integrated current collector (102), and an electrical contact point (103) protruding from the frame. The electrodes frames are also shown to have features for the mechanical joining of abutting electrodes using an overlapping mechanism (104) and a tongue and groove mechanism (105). In some embodiments, the electrodes will be substantially planar, porous shape, such as a flat sheet, mesh, perforated sheet, flexible sheet or foam (100), with a frame around the exterior (101). The frame may function as a support structure to add rigidity to the planar electrode material, as an electrical insulator to prevent electrical shorting, and/or as a current collector. This is suitable for use in the construction of electrodes for use as anodes and/or cathodes as well as for both bio-electrodes and abiotic electrodes.

In some embodiments, the frames may be constructed out of a combination of non-conductive materials and conductive materials, such that the non-conductive portion of the frame will function as an insulator while conductive materials function as current collectors. The materials used for the frame can be any material (or combinations of materials) which have the requisite insulating or conductive properties. In some specific embodiments, the insulating material is a plastic and the conductive material is stainless steel. However, other materials contemplated for use in this invention are rubber, ceramic, or glass as an insulating material and, as a conductive material: metals, such as iron, copper, aluminum, titanium, zinc, nickel, copper or alloys thereof, or; other conductive materials such as conductive paints or epoxies or carbon (e.g., graphite, graphene, conductive carbon, carbon black, activated carbon).

The frame may be a single-piece or multi-piece frame. In some embodiments, the frame includes one or more securing mechanisms, e.g., slotted groove(s) or fasteners, with which the planar electrode material can be secured onto the frame. Alternatively, the frame may include two pieces fastened on opposite sides of the electrode material (i.e., the electrode material is "sandwiched" between the two sides of the frame). The frame can take any shape configured so as to provide sufficient support. In certain embodiments, the frame will be located at least around the exterior perimeter of the planar electrode material. The frame may include various strips across the area bounded by the perimeter piece, such as a grid. Any other methods of securing the electrode onto the frame known in the art are contemplated.

In certain embodiments, each electrode material, e.g., planar electrode, will be held near a planar plastic mesh serving as an insulating separator. The plastic mesh can be fastened to the electrode mesh, for instance using zipper tie (cable ties). The plastic mesh will be functioned as spacer between two adjacent planar electrodes to prevent electrical shorting. The planar plastic mesh may be inserted into the grooves of the frame or as part of a cassette assembly.

In certain embodiments, the electrode frame may include a mechanism to join abutting electrodes or cassettes in the same plane. As shown in FIG. 1, this mechanism may be an overlapping assembly (104) to prevent shifting, an interlocking tongue and groove assembly (105), or other form of mechanical assembly. The frame components may be constructed with asymmetry to facilitate these mechanical assemblies. Interlocking components may be included on sides abutting other components while not included on sides not abutting other components. Assemblies may be held together using clips, fasteners, ties, wraps, or other means.

In some embodiments, the conductive materials, electrode (100) or current collector (102) will be selectively exposed to the exterior surface of the frame, thereby creating contact points (103) which will allow for an electrical connection between the electrode and the rest of the electrical system (FIG. 1). The current collectors included in the frame can be augmented with strips or wires across the surface of the electrode. In some embodiments, the conductive material may be protected by the insulating material in order to prevent a short circuit, particularly where exposed to the exterior of the frame.

In some embodiments, the conductive contact points could take a variety of forms, such as discrete points located on the edge of the frame or a strip of conductive material along a portion or the entirety of the edge. The conductive contact points could be located along either the edge perpendicular to the planar surface or the edge parallel to it.

In some embodiments, the electrode current collector is connected to an exterior conductor for transmission to the electrical circuitry. The connection method may include mechanical fastening, mechanical coalescence, mechanical crimping, welding, soldering, chemical fastening and joining. The connection may be enhanced through inclusion of advantageous substances in the connection, such as anti-corrosive substances, chemical-resistant additives, connection sealants, and other chemicals to maintain a healthy electrical connection. The exterior of the connection may also be protected by materials that shrink to ensure moisture-resistance.

In certain embodiments, a planar mesh electrode material may be sandwiched between two pieces of a plastic frame, with rubbing padding attached to the plastic on the side facing the electrode material. Stainless steel wire or strips will be used as current collectors and held against the electrode material by the rubber padding. In certain embodiments, a strip of stainless steel will be attached to the perimeter of the electrode such that it is exposed along the length of the edge perpendicular to the planar mesh.

In certain embodiments, the current collectors of a single electrode can be attached to a conductive superstructure, to provide an intermediary interface to the electrical circuitry.

Electrode Pair Cassette

Figure 3A:
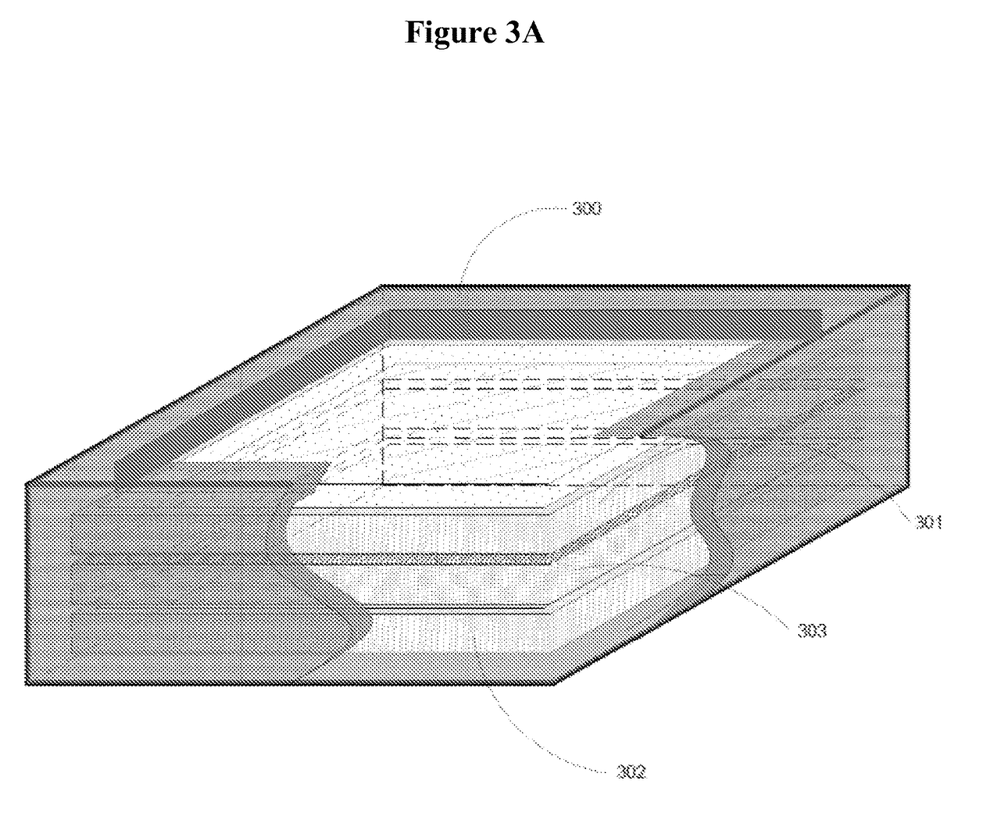
FIG. 3A illustrates an isometric view of an electrode cassette enclosed on the edges by a frame (300) encompassing a working electrode (301), a counter electrode (302), an insulating spacer material (303), and optional planer electrode frame components (304)
Figure 3B:
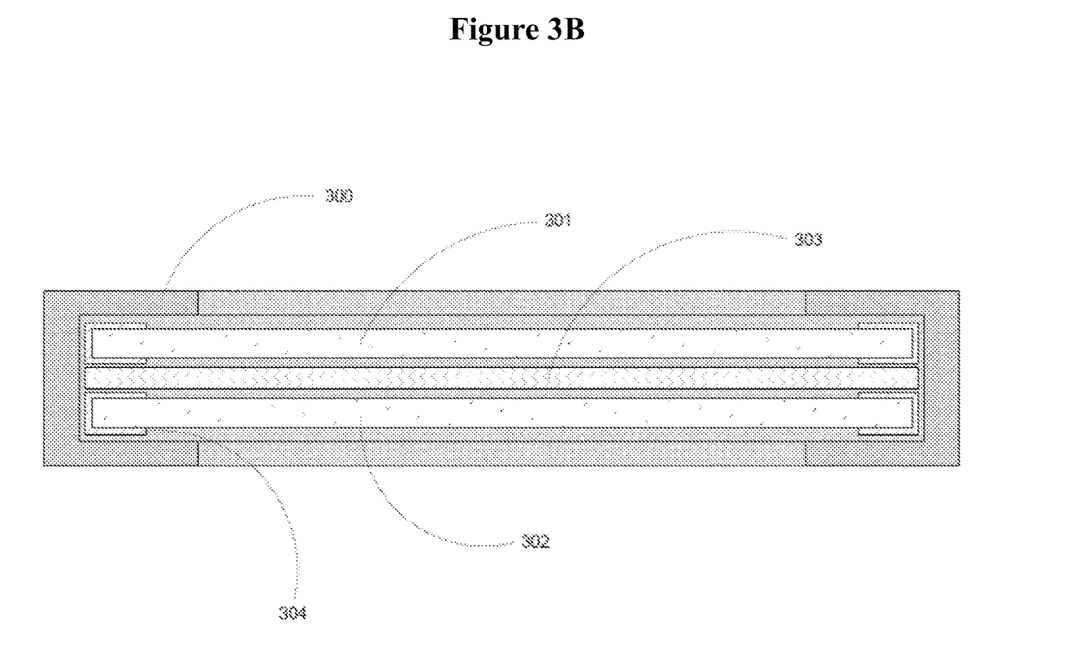
FIG. 3B illustrates an orthographic view of the same electrode, according to one or more embodiments.

In some embodiments, two or more electrodes can be assembled pairwise into an electrode cassette (FIGS. 3A and 3B). The electrode cassette may be used as a minimal modular building block for assemblies comprised of any or all components that are necessary and sufficient for bio-electrochemical activity. These components may include, but are not limited to: working electrode (301), counter electrodes (302), current collectors, electrode frames (300), non-conductive spacer elements (304), and electrical wiring and circuitry. In certain embodiments, the cassette will allow for easy replacement of electrode pairs in a BES system. The cassette can be manufactured to be securely placed within a rack structure or independently supported in a BES system.

In some embodiments, the frame may include an insulating structure disposed between two electrodes, electrode pairs, or electrode cassettes. In this fashion, the frame can provide support for electrodes placed abutting each other in the same plane. The frame may be, but does not need to be, a single piece of material. The frame may or may not be mechanically attached to the electrode or current collector material as long as the required function can be performed.

Electrode pair cassette frames may contain all of the same functionality as planer electrode frames, including but not limited to support structure, current collection, electrical insulation, and mechanical assembly features.

Component Assemblies & ElectrodeRacks

Figure 2:
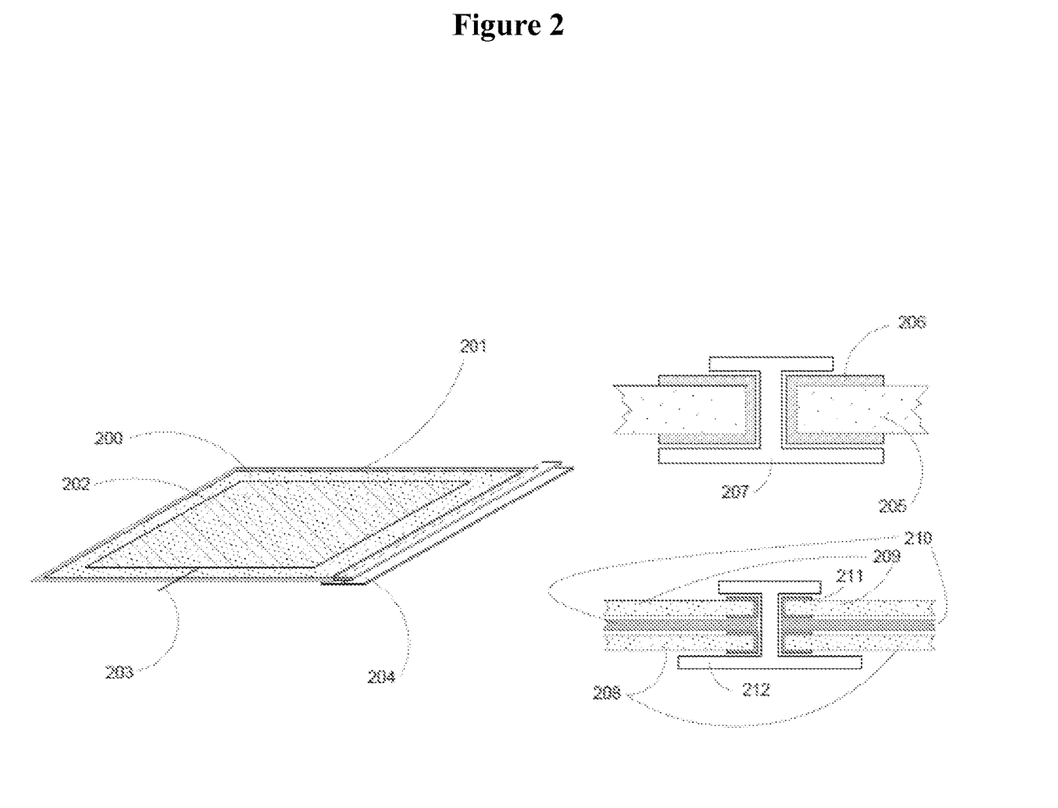
FIG. 2 illustrates an electrode assembly with planer electrode (200) with a frame (201), an integrated current collector (202), and an electrical contact (203) joined to a second electrode assembly with an H-channel (204), accordingly to one or more embodiments.

Planer electrodes or electrode cassette abutting each other within the same plane may be fastened together in an assembly. As shown in FIG. 2, in some embodiments, components may be fastened through the use of a dual-sided channel, or H-channel. The H-channel (204) may be employed for joining electrode assemblies of planer electrode (200) with a frame (201), an integrated current collector (202), and an electrical contact point (203). The H-channel (207) can be used to join single planer electrodes (205) with flat edge frames (206). Alternatively, the H-channel (212) can be used to join two electrode cassettes with working electrodes (208), counter electrodes (209), insulating spacers (210), and frame components (211).

In some embodiments, the rack includes one or more securing mechanism, e.g., slotted groove(s) or fasteners, with which the electrode can be secured onto the rack. Any other methods of securing the electrode onto the rack known in the art are contemplated.

Figure 4A:
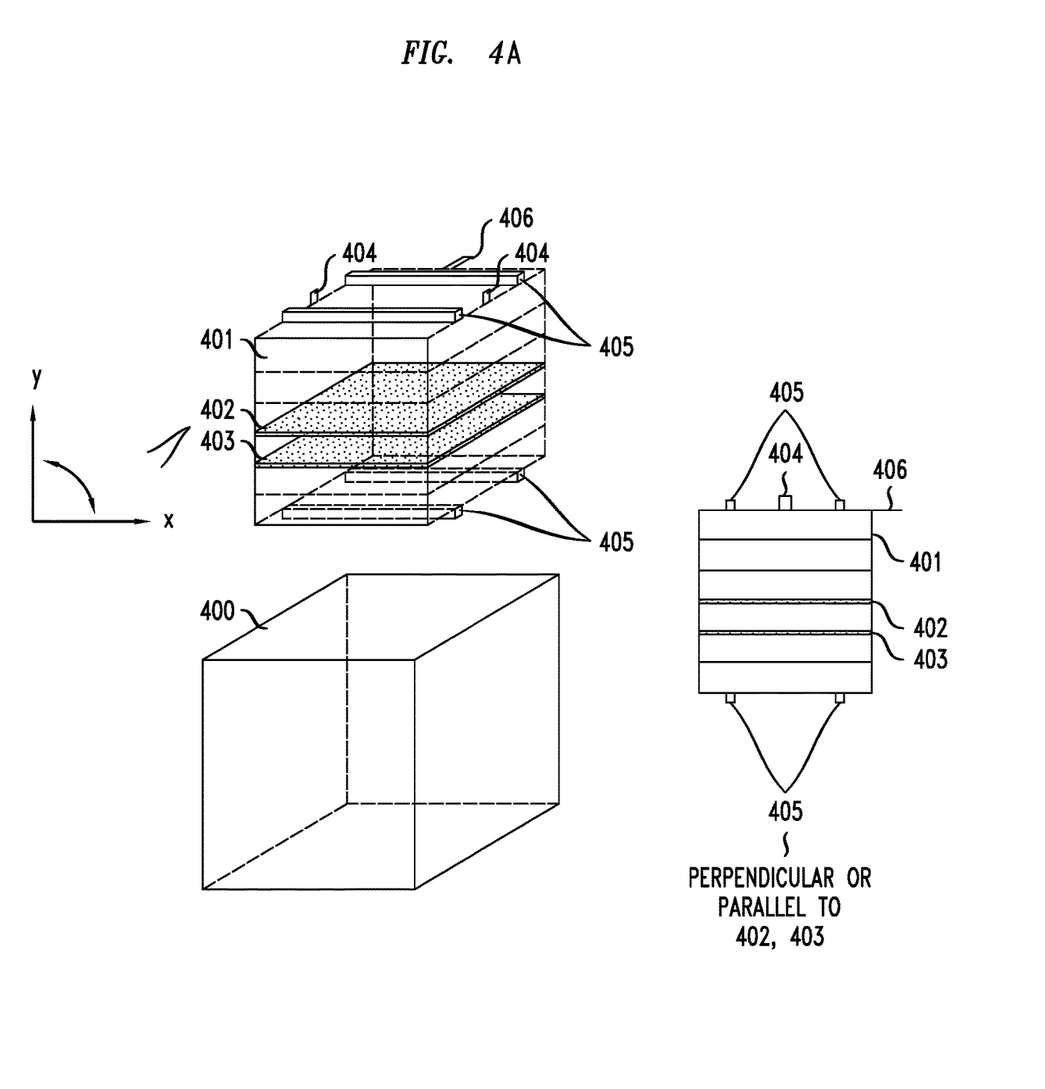
FIGS. 4A and 4B illustrate a reaction chamber (400) with a rack assembly (401) containing a working electrode (402) and a counter electrode (403), and featuring hoist attachment points (404) hydraulic manifolds (405) integrated instruments and wiring (406), according to one or more embodiments.
Figure 4B:
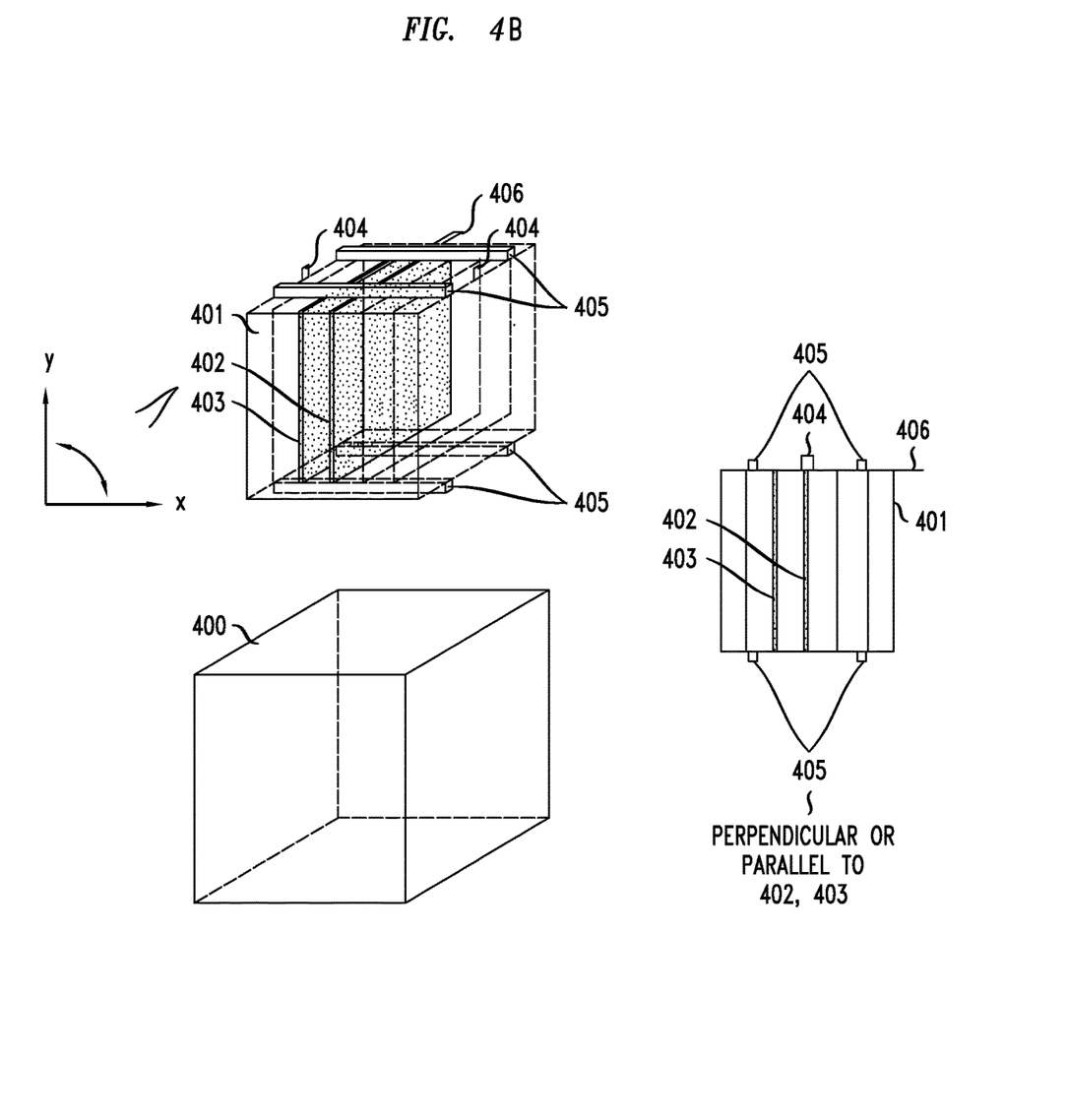

In certain embodiments, as shown in FIGS. 4A and 4B, when utilized by the BES, the electrodes may be placed in an electrode rack (401) within the treatment chamber (400). The rack will be configured such that each working electrode (402) and counter electrode (403) will be held in place by a separate slot, groove, or other mechanical mechanism. The electrodes may be inserted or removed into each slot as needed. The electrode rack may be configured such that the conductive points on the electrode contact conductive material in the electrode rack when the electrode has been inserted into its slot in the rack. Separate contact points may be provided for anodes and cathodes.

It should be noted that, although the electrode rack has been described as a distinct structure disposed within the reaction chamber, it could also be incorporated into the reaction chamber itself, such as, for example, grooves within the sides of a tank used as the treatment chamber.

For example, in one embodiment, the rack could be made entirely of stainless steel (or another conductive material). Voltage could be applied to the electrodes from a single point of contact with the conductive rack. Alternatively, current could be harvested from a single point of contact. In this fashion, the rack is an integrated current collector mechanism. Alternatively, in some embodiments, the counter-electrodes could be incorporated directly into the rack as permanent fixtures. For example, where the removable electrodes are anodes, the rack itself could be functionalized as a cathode or vice versa. This is particularly appropriate where the rack is stainless steel, as the rack itself would function as the cathode.

The electrode rack can be oriented in any direction or in any shape or size, as required by the overall BES structure. In a BES utilizing the electrodes in certain embodiments, the rack will generally be oriented such that the electrodes' plane is perpendicular to the flow of water to be treated. However, electrodes may also be oriented parallel to the direction of flow or at some angle between parallel and perpendicular. Non-limiting examples of the angles include about 5, 10, 15, 20, 25, 30, 35, 40, 45, 50, 60, 70, 80, or 85 degree, or in a range bounded by any two of the angles disclosed herein.

In some embodiments, the electrode rack can be configured to provide enhanced hydraulic distribution or collection elements (405) or elements to enhance mixing in the BES system (FIGS. 4A and 4B). For example, in one embodiment, a fluid distribution manifold can be integrated into the rack structure. The distribution manifold can be positioned within the rack or as a part of the rack such that the fluid flow through the BES system is even and uniform for a given BES geometry. The fluid distribution manifold can also be used as a mechanism for a cleaning the BES system. In another embodiment, the rack structure can be configured with elements for hydraulic elements or features, for example baffles, that induce turbulence and enhance mixing within the BES system. In another embodiment, the electrode rack can be configured with a fluid collection element, e.g., a manifold, to provide a collection point for the BES system. In some embodiments, the collection manifold can be positioned with in the rack or as a part of the rack.

In certain embodiments, the rack comprises one or more connection points for hoisting or raising the rack and/or the electrode. In other embodiments, the rack comprises elements for air injection. For instance, the rack may include one or more ports or connection to air inlet to inject air, oxygen, nitrogen, or another suitable gas. In still other embodiments, the rack contains features for reference electrode installation. In other embodiments, the rack contains features for wiring integration.

In some embodiments, the electrode rack can be configured with features and mechanisms for solids management in the BES system. For example, in one embodiment, a gas injection manifold can be integrated into the rack structure or as a part of the rack structure. In some embodiments, the gas injection manifold can be used to inject air or other gases into the system thereby providing a source of turbulence that can remove solids and residue in the BES system. In some embodiments, the gas injection manifold can be of a configuration that enhances gas turbulence for a given BES geometry. In some embodiments, the gas injection system can also be used as a mechanism for cleaning the BES system. In an alternative arrangement, the gas injection system can be used to injected gases that enhance the reaction that is occurring in the BES system. For a non-limiting example, $CO_2$ or a similar gas could be used as a gas source to enhance the methane conversion in a BES system. Alternatively, $N_2$ or other inert gases could be used to blanket the reactor or as a stripping agent. Other gases could be introduced as reactants in the process, including but not limited to $H_2S$ as a fuel or oxygen as an oxidizing agent.

In some embodiments, the electrode rack can be configured with features and mechanisms that provide a means to install or remove the rack from the reactor. For example, in one embodiment, a connection point such as a hook, an eyelet, or similar such feature (404) could be integrated in the rack system to allow the rack to be moved by means of a mechanical device (FIGS. 4A and 4B).

As shown in FIGS. 4A and 4B, in some embodiments, the electrode rack can be configured such that a reference electrode(s) can be installed within or at the electrode rack (406). A reference electrode may be held in close proximity to an electrode or otherwise submerged in the liquid environment. The rack may also contain mounting locations and wiring for other instruments and sensors (406), including but not limited to temperature, pH, conductivity, ion-specific electrodes, optical sensors, dissolved oxygen, and liquid level. Instruments and rack wiring may be integrated with local logic operations or with a centralized control system.

As shown in FIGS. 4A and 4Bs, in some embodiments, the electrode rack can be configured such that electrode wiring is integral with, or form a unitary body with the rack system (406). In one such arrangement the electrode rack incorporates a means to route electrode wiring from the electrodes to a central connection point in the rack structure. In some embodiments, plugs and wires may be integrated into the rack.

The functionality of the rack can include any one of the above features or any combination of two or more of the above features.

Application to Enhanced Anaerobic Digestion

In some embodiments, the electrodes described herein can be used in multiple types of BES, or integrated into an anaerobic treatment or anaerobic digestion ("AD" collectively) system.

In some embodiments, the electrode rack is integrated into an AD system to augment either upflow, downflow, plug flow, static fixed bed, dynamic fixed bed, fluidized bed, sludge blanket, expanded granular sludge bed, internal circulation, continuously stirred tank reactors ("CSTR"), batch, fed batch, sequencing batch, or membrane type AD reactors.

The BES components may constitute additional hydraulic features associated with the performance of the overall system design. In some embodiments, the electrode rack could be disposed within the bioreactor such that the rack would be at the top region of the tank, while the bottom region would be utilized for sludge based digestion.

One embodiment for a modified CSTR or other anaerobic treatment system would be comprised of a substantially circular tank. In this embodiment, the rack and electrodes would have a substantially circular shape. This design can be further refined so as to create three distinct chambers. Each chamber can be operated as any type of anaerobic treatment system CSTR, settling tank or slow digester. Each chamber can be separated by a filter, baffle, membrane and/or other separation mechanism. The higher chambers (one or both) may be functioning as CTSR reactors, while the lower chambers may function as the settling tank or slow digester. Varying volume levels may be controlled so as increase the hydraulic retention time for each chamber as needed.

A support structure for biofilm growth, such as packing material, could be introduced into any region of the reactor, particularly in the top region(s) below the electrode rack, in order to provide a more advantageous surface for growth of microbes for the water treatment. The support structure could also be constructed or packaged in cartridges or modules to be inserted into a rack similar to that which houses the electrodes, or a single rack could be used for the electrodes and support structure. This would allow for easy maintenance or replacement of the support structure.

EXAMPLES

Figure 5:
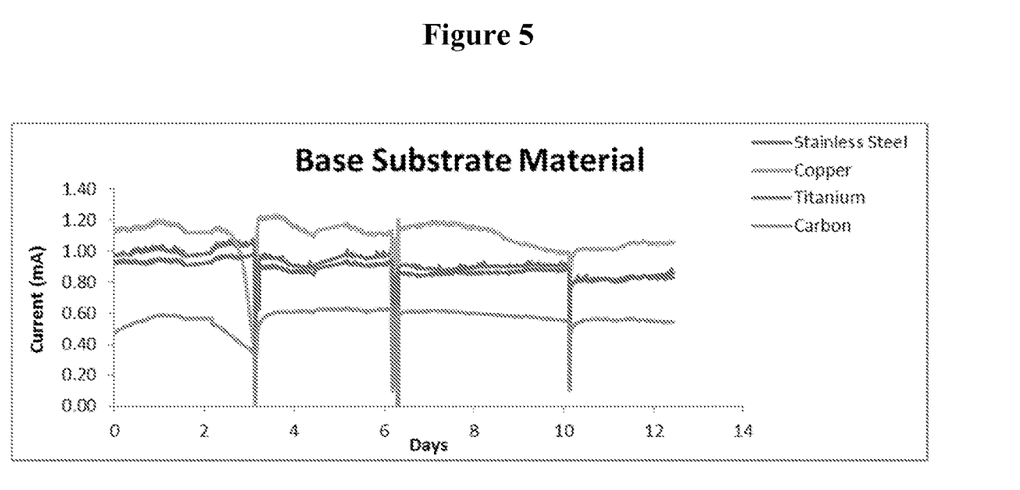
FIG. 5 illustrates the performance of planer biological anodes of varying base materials including: copper, stainless steel, carbon and titanium as demonstrated in practice in four batch cycles operated over a period of 12 days, according to one or more embodiments.

FIG. 5 illustrates the performance of planer biological anodes of varying base materials including: copper, stainless steel, carbon and titanium as demonstrated in practice in four batch cycles operated over a period of 12 days. Systems were operated with a consistent abiotic cathode in identical bench scale reactors with a fuel of synthetic wastewater. Metal bases were coated with the same conductive coating, carbon was uncoated. Copper-based substrate material was shown to exhibit the highest current levels.

Figure 6:
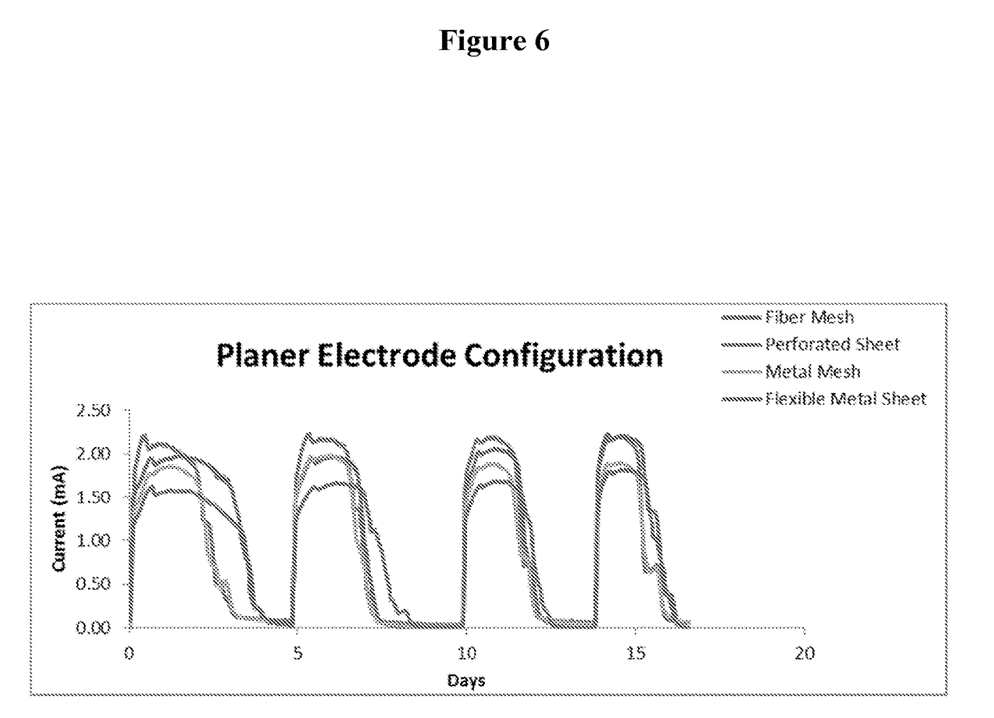
FIG. 6 illustrates the performance of various architectures of planer biological anodes including: fiber sheet, perforated sheet, metal mesh, and flexible metal sheet as demonstrated in practice in four batch cycles operated over a period of 16 days, according to one or more embodiments.

FIG. 6 illustrates the performance of various architectures of planer biological anodes including: fiber sheet, perforated sheet, metal mesh, and flexible metal sheet as demonstrated in practice in four batch cycles operated over a period of 16 days. Systems were operated with a consistent abiotic cathode in identical bench scale reactors with a fuel of synthetic wastewater. All metal sheets (perforated, mesh, flexible sheet) were coated with the same conductive coating.

The foregoing illustrates one or more specific embodiments of this invention. Other modifications and variations of the invention will be readily apparent to those of skill in the art in view of the teaching presented herein. The foregoing is intended as an illustration, but not a limitation, upon the practice of the invention.

What is claimed is:

1. A bio-electrochemical system, comprising:
   at least one reactor chamber consisting of:
      one or more hydraulic distribution elements and one or more fluid-collection elements;
      a rack disposed within the reactor chamber and comprising one or more securing mechanisms, wherein one of the one or more securing mechanisms comprises a plurality of slotted grooves; and
      a plurality of working electrodes and a plurality of counter electrodes in the reactor chamber, each of the working and counter electrodes being removable and (i) each individually and vertically positioned parallel to an input of wastewater such that the wastewater flows vertically over each electrode, and (ii) each individually disposed in one of the plurality of slotted grooves in the rack to secure the electrodes.

2. The system of claim 1, wherein the working electrodes and/or the counter electrodes are disposed in the plurality of slotted grooves in the form of a removable cassette.

3. The system of claim 1, wherein the working electrodes are in electrical communication with the rack.

4. The system of claim 1, wherein the one of the one or more securing mechanisms consists of a plurality of fasteners.

5. The system of claim 1, wherein the rack is composed of a conductive substance.

6. The system of claim 1, wherein the rack is composed of stainless steel.

7. The system of claim 1, wherein the rack comprises baffles.

8. The system of claim 1, wherein the rack is removable from the reactor chamber.

9. The system of claim 1, wherein the rack comprises one or more connection points for hoisting.

10. The system of claim 1, wherein the rack further comprises one or more elements for wiring integration.

11. The system of claim 1, wherein portions of the rack are disposed at a top region of the reactor chamber.

12. The system of claim 1, wherein a bottom region of the reactor chamber is configured for sludge based digestion.

13. A bio-electrochemical system, comprising:
   at least one reactor chamber consisting of:
      a gas injection manifold;
      a rack disposed within the reactor chamber and comprising one or more securing mechanisms, wherein one of the one or more securing mechanisms comprises a plurality of slotted grooves; and
      a plurality of working electrodes and a plurality of counter electrodes in the reactor chamber, each of the working and counter electrodes being removable and (i) each individually and vertically positioned parallel to an input of wastewater such that the wastewater flows vertically over each electrode, and (ii) each individually disposed in one of the plurality of slotted grooves in the rack to secure the electrodes.

14. A bio-electrochemical system, comprising:
   at least one reactor chamber consisting of:
      features for reference electrode installation;
      a rack disposed within the reactor chamber and comprising one or more securing mechanisms, wherein one of the one or more securing mechanisms comprises a plurality of slotted grooves; and
      a plurality of working electrodes and a plurality of counter electrodes in the reactor chamber, each of the working and counter electrodes being removable and (i) each individually and vertically positioned parallel to an input of wastewater such that the wastewater flows vertically over each electrode, and (ii) each individually disposed in one of the plurality of slotted grooves in the rack to secure the electrodes.

15. A bio-electrochemical system, comprising:
   at least one reactor chamber consisting of:
      one or more sensors for collecting system information;
      a rack disposed within the reactor chamber and comprising one or more securing mechanisms, wherein one of the one or more securing mechanisms comprises a plurality of slotted grooves; and
      a plurality of working electrodes and a plurality of counter electrodes in the reactor chamber, each of the working and counter electrodes being removable and (i) each individually and vertically positioned parallel to an input of wastewater such that the wastewater flows vertically over each electrode, and (ii) each individually disposed in one of the plurality of slotted grooves in the rack to secure the electrodes.

* * * * *